(12) United States Patent
Cromie

(10) Patent No.: US 7,503,571 B2
(45) Date of Patent: Mar. 17, 2009

(54) SEAT DELIVERY PALLET

(75) Inventor: Victor Cromie, Co. Down (IE)

(73) Assignee: BE Aerospace, Inc., Wellington, FL (US)

( * ) Notice: Subject to any disclaimer, the term of this patent is extended or adjusted under 35 U.S.C. 154(b) by 87 days.

(21) Appl. No.: 11/673,653

(22) Filed: Feb. 12, 2007

(65) Prior Publication Data

US 2007/0193904 A1  Aug. 23, 2007

Related U.S. Application Data

(60) Provisional application No. 60/772,915, filed on Feb. 13, 2006.

(51) Int. Cl.
*B60P 1/00* (2006.01)

(52) U.S. Cl. ............... 280/79.11; 280/32.6; 280/47.11; 280/47.34; 280/47.131; 280/62; 280/80.1; 280/87.01

(58) Field of Classification Search .............. 280/79.11, 280/32.6, 47.11, 47.34, 47.131, 62, 80.1, 280/87.01; 414/789.5; 410/46; 108/55.1, 108/57.25
See application file for complete search history.

(56) References Cited

U.S. PATENT DOCUMENTS

| | | | | |
|---|---|---|---|---|
| 4,166,638 A * | 9/1979 | De Prado | ................. | 280/638 |
| 4,978,097 A * | 12/1990 | Froutzis | .................... | 248/503.1 |
| 5,035,445 A * | 7/1991 | Poulin | .................. | 280/763.1 |
| 5,101,964 A * | 4/1992 | Westphal | ............... | 198/867.14 |
| 5,497,708 A * | 3/1996 | Jeruzal | ....................... | 108/54.1 |
| 5,575,389 A * | 11/1996 | Alspach et al. | ............. | 206/386 |
| 5,626,231 A * | 5/1997 | Kwong et al. | ................ | 206/600 |
| 5,894,803 A * | 4/1999 | Kuga | ........................ | 108/51.11 |
| 6,109,625 A * | 8/2000 | Hewitt | ....................... | 280/43.24 |
| 6,203,031 B1 * | 3/2001 | Leverington | .................. | 280/35 |
| 6,474,245 B2 * | 11/2002 | Richard | ....................... | 108/54.1 |
| 6,746,189 B2 * | 6/2004 | Kennedy | ...................... | 410/43 |
| 6,923,606 B2 * | 8/2005 | Fehrle et al. | ................... | 410/46 |
| 6,969,228 B2 * | 11/2005 | Thoms | .................... | 414/789.5 |
| 7,213,820 B2 * | 5/2007 | Drummond | .............. | 280/79.11 |

* cited by examiner

*Primary Examiner*—Christopher P Ellis
*Assistant Examiner*—Cynthia F Collado
(74) *Attorney, Agent, or Firm*—Adams Intellectual Property Law, P.A.

(57) ABSTRACT

A seat delivery pallet including a platform including: end members, side members, and a center member extending between the side members; a seat support member positioned between and moveably attached one end member and the center member; a seat support member positioned between and moveably attached to the side members; and a first foot locking device slidably attached to one seat support member and another foot locking device slidably attached to another seat support member. A method of delivering a seat having feet with enlarged locking studs is also disclosed.

20 Claims, 7 Drawing Sheets

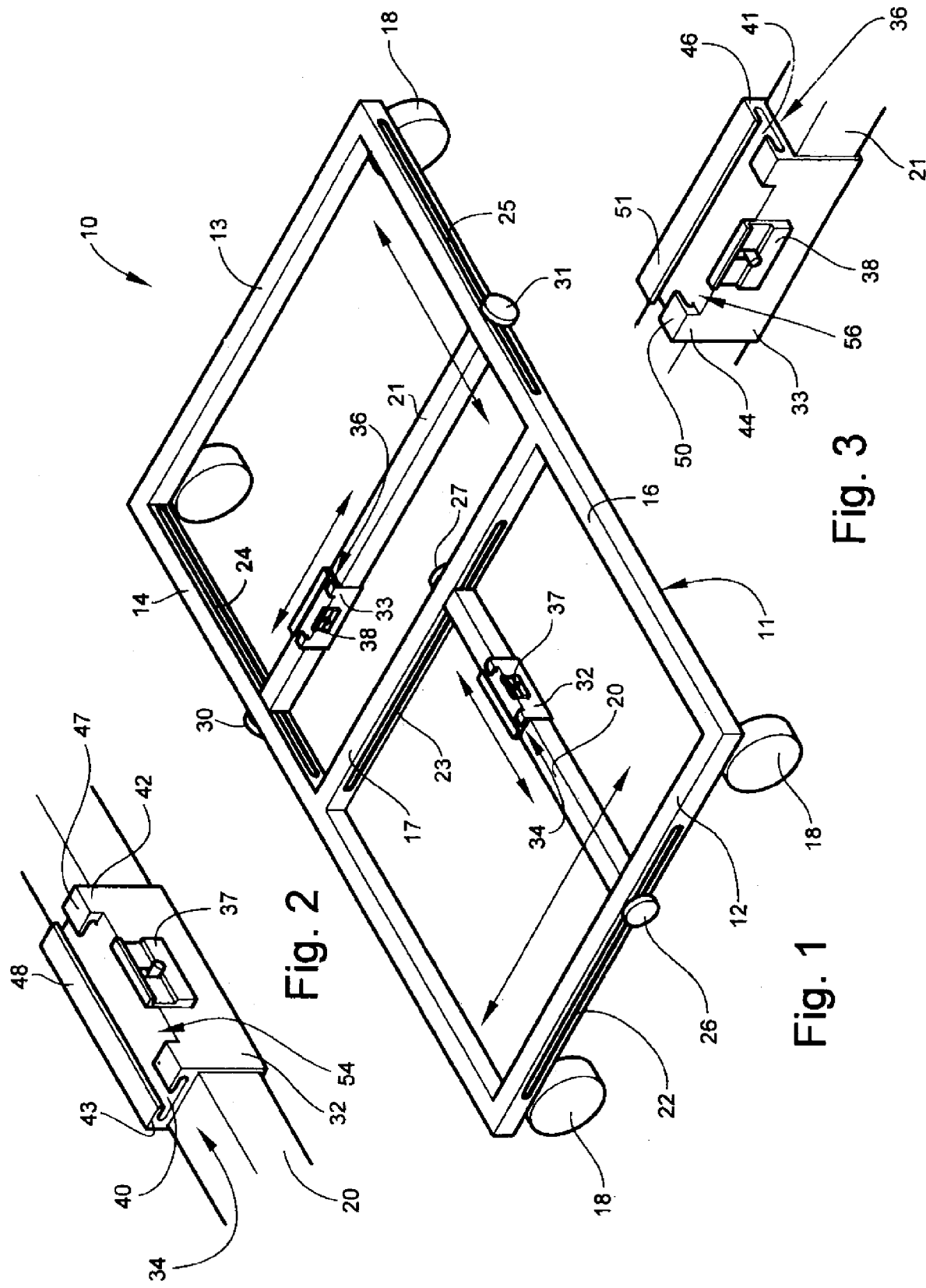

SEAT DELIVERY PALLET

CROSS-REFERENCE TO RELATED APPLICATIONS

This application claims the benefit of Provisional Application No. 60/772,915, filed on Feb. 13, 2006.

TECHNICAL FIELD AND BACKGROUND

The present disclosure relates to delivery pallets for the delivery of parts, assemblies, or products. In particular, the invention relates to a reuseable seat delivery pallet for transporting seats, such as an aircraft seat, to a site with minimal packaging.

Pallets are flat structures used to transport parts, assemblies, or products that are heavy, or require a substantially stiff structure to prevent twisting. One particular use has been to use pallets for the transportation of aircraft seats. The pallets allow the seats to be fastened to the pallet and delivered to a site without damage. However, the seats are typically fastened to the pallets using screws or bolts, requiring removal of the screws or bolts before removing the seats from the pallet. Additionally, due to the weight of the seats and pallet, a forklift or similar machinery is needed to move the seats to the desired location.

Accordingly, there is a need for a seat delivery pallet that allows different sized seats to be secured to the pallet, that does not require the use of separate fasteners, that is easily moved without the use of a forklift or other machinery, that is stackable, and that is reuseable.

SUMMARY

Therefore it is an object of the invention to provide a seat delivery pallet that can accommodate seats of various sizes.

It is another object of the invention to provide a seat delivery pallet that minimizes packaging.

It is another object of the invention to provide a seat delivery pallet that is reuseable.

It is another object of the invention to provide a seat delivery pallet that allows a seat to be easily secured to or removed from the seat delivery pallet without the use of removable bolts or other fasteners.

It is another object of the invention to provide a seat delivery pallet that locks a seat in position on the seat delivery pallet.

It is another object of the invention to provide a seat delivery pallet that is stackable.

These and other objects of the present invention are achieved in the preferred embodiments disclosed below by providing a seat delivery pallet including: a platform having first and second end members, first and second side members, and a center member extending between the first and second side members; a first seat support member positioned between and moveably attached to the first end member and the center member; a second seat support member positioned between and moveably attached to the first and second side members; and a first foot locking device slidably attached to the first seat support member and a second foot locking device slidably attached to the second seat support member wherein a first foot of a seat is secured in the first foot locking device and a second foot of the seat is secured in the second foot locking device to secure the seat to the platform.

According to another preferred embodiment of the invention, each of the first and second foot locking devices includes a locking track to allow sliding movement of a foot therein and prevent vertical movement of the foot.

According to another preferred embodiment of the invention, the locking track includes a slot positioned between spaced-apart sidewalls.

According to another preferred embodiment of the invention, each of the sidewalls includes a horizontally disposed shoulder extending inwardly into the slot to prevent the foot from moving vertically out of the slot.

According to another preferred embodiment of the invention, the first and second foot locking devices each include a lock to prevent the first and second foot locking devices from sliding along respective first and second seat support members.

According to another preferred embodiment of the invention, the lock is moveable between a locked position and an unlocked position.

According to another preferred embodiment of the invention, in the locked position the lock extends upwardly to act as a sidewall.

According to another preferred embodiment of the invention, the seat delivery pallet includes stacking members positioned on each corner of the platform to allow multiple like pallets to be stacked.

According to another preferred embodiment of the invention, the seat delivery pallet includes castors or wheels attached to a bottom of the platform to allow movement.

According to another preferred embodiment of the invention, a seat delivery pallet adapted to secure a seat having feet with enlarged locking studs thereon includes: a platform having first and second end members, first and second side members, and a center member extending between the first and second side members; a first seat support member positioned between and moveably attached to the first end member and the center member; a second seat support member positioned between and moveably attached to the first and second side members; and a first foot locking device slidably attached to the first seat support member and a second foot locking device slidably attached to the second seat support member.

According to another preferred embodiment of the invention, one foot locking device is slidable toward the center member.

According to another preferred embodiment of the invention, one foot locking device is slidable toward one of the side members.

According to another preferred embodiment of the invention, one of the first and second end members includes a slot for receiving one of the seat support members.

According to another preferred embodiment of the invention, the center member includes a slot for receiving one of the seat support members.

According to another preferred embodiment of the invention, each of the side members includes a slot for receiving one of the seat support members.

According to another preferred embodiment of the invention, one support member is slidable toward the center member.

According to another preferred embodiment of the invention, wherein one support member is slidable toward one of the side rails According to another preferred embodiment of the invention, each support member is selectively securable in a pair of opposing slots.

According to another preferred embodiment of the invention, the first support member is disposed transverse the second support member.

According to another preferred embodiment of the invention, a method of delivering a seat having feet with enlarged locking studs includes the steps of:

According to another preferred embodiment of the invention, a method of delivering a seat having feet with enlarged locking studs is disclosed and includes the steps of providing a seat delivery pallet that includes a platform having first and second end members, first and second side members, and a center member extending between the first and second side members. A first seat support member is positioned between and moveably attached to the first end member and the center member and a second seat support member is positioned between and moveably attached to the first and second side members. A first foot locking device is slidably attached to the first seat support member and a second foot locking device is slidably attached to the second seat support member. One of the enlarged locking studs of the seat is secured in each of the foot locking devices, and the position of the first and second seat support members is adjusted securing the first and second support members in position.

BRIEF DESCRIPTION OF THE DRAWINGS

The invention may be best understood by reference to the following description in conjunction with the accompanying drawing figures in which:

FIG. 1 is a perspective view of a seat delivery pallet according to an embodiment of the invention;

FIG. 2 shows a foot locking device of the seat delivery pallet of FIG. 1;

FIG. 3 shows another foot locking device of the seat delivery pallet of FIG. 1;

DESCRIPTION OF PREFERRED EMBODIMENTS

Figure 4:
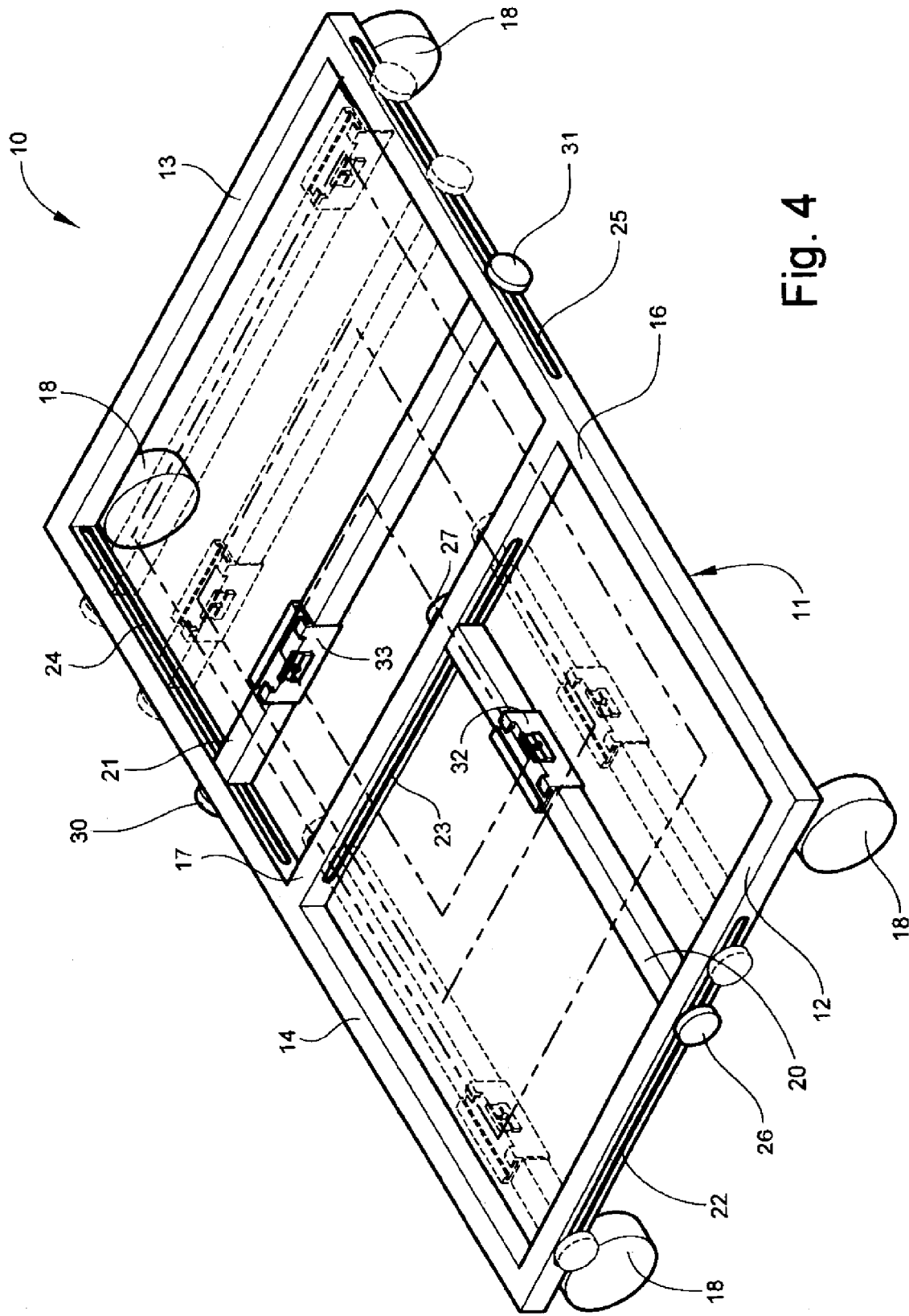
FIG. 4 shows the seat delivery pallet of FIG. 1 with adjustments for various sized seats shown.

Referring now specifically to the drawings, a seat delivery pallet according to an embodiment of the invention is illustrated in FIG. 1 and shown generally at reference numeral 10. The seat delivery pallet 10 includes a platform 11 having end rails 12 and 13 and side rails 14 and 16, and a center rail 17 extending between the side rails 14 and 16. Wheels or rollers, such as castors 18, are secured to a bottom of the platform 11 to allow the pallet 10 to be rolled as needed. However, a forklift may be used, if desired. The platform 11 may be manufactured out of wood, metal, plastic, or any other suitable material.

A pair of seat support members 20 and 21 are used to support and secure a seat on the platform 11. Seat support member 20 is positioned between end rail 12 and center rail 17 and moveably attached thereto by slots 22 and 23 extending through the sides of the rails 12 and 17, respectively. Seat support member 21 is positioned between side rails 14 and 16 and is adjustably attached by slots 24 and 25 extending through the sides of the rails 14 and 16, respectively. The slots 22, 23 and 24, 25 allow the seat support members 20 and 21 to move between the rails 12, 17 and 14, 16, respectively, to a desired position. Once the seat support members 20 and 21 have been moved to the desired position, they are locked in that position by locks 26, 27 and 30, 31.

As shown in FIG. 1, the seat support members 20 and 21 include foot locking devices 32 and 33, respectively. The foot locking devices 32 and 33 are mounted for sliding movement along the seat support members 20 and 21, and include locking tracks 34 and 36 and locks 37 and 38. As illustrated in FIG. 4, the seat support members 20 and 21 and the foot locking devices 32 and 33 allow the foot locking devices 32 and 33 together to be positioned in various locations on the platform 11 for accepting seats of various sizes.

Referring to FIGS. 2 and 3, the locking tracks 34 and 36 allow sliding movement, but lock against vertical movement of a seat. Tracks 34 and 36 include respective slots 40 and 41 positioned between spaced-apart sidewalls 42, 43 and 44, 46. A pair of opposing, horizontally disposed, shoulders 47, 48 and 50, 51 extend inwardly from the sidewalls 42, 43 and 44, 46 into the slots 40 and 41 to provide undercut areas beneath the shoulders 47, 48 and 50, 51.

Locks 37 and 38, respectively, prevent the foot locking devices 32 and 33 from sliding along the respective seat support members 20 and 21. The locks 37 and 38 are moveable between a locked position, FIG. 3, and an unlocked position, shown in FIG. 9. In the locked position, the locks 37 and 38 extend upwardly to act as a sidewall and fill in respective openings 54 and 56 in the sidewalls 42 and 44.

Figure 5:
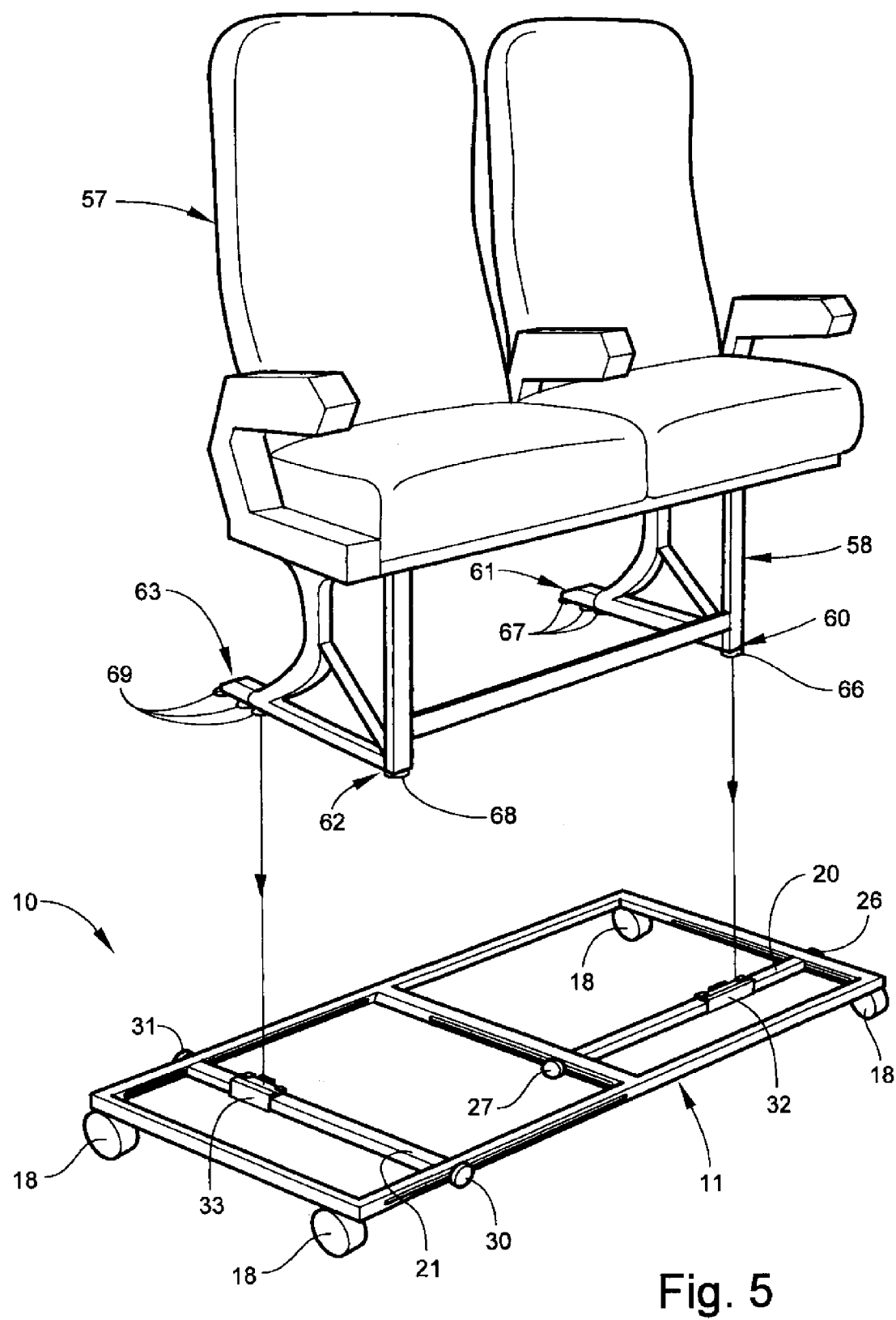
FIG. 5 shows a seat being positioned on the seat delivery pallet of FIG. 1.

Referring to FIGS. 4-10, a seat 57 having a frame 58 and feet 60-63 may be secured to the platform by securing foot 60 in foot locking device 32 and foot 63 in foot locking device 33. To secure the seat to the platform 11, seat support members 20 and 21 and foot locking devices 32 and 33 are moved generally to a position where the locking devices 32 and 33 are in position to receive feet 60 and 63. Feet 60-63 include enlarged locking studs 66-69, respectively, for being received within the slots 40 and 41. As shown in FIG. 5, the seat 57 is positioned over the platform 11 to allow the seat 57 to be secured thereto.

Figure 6:
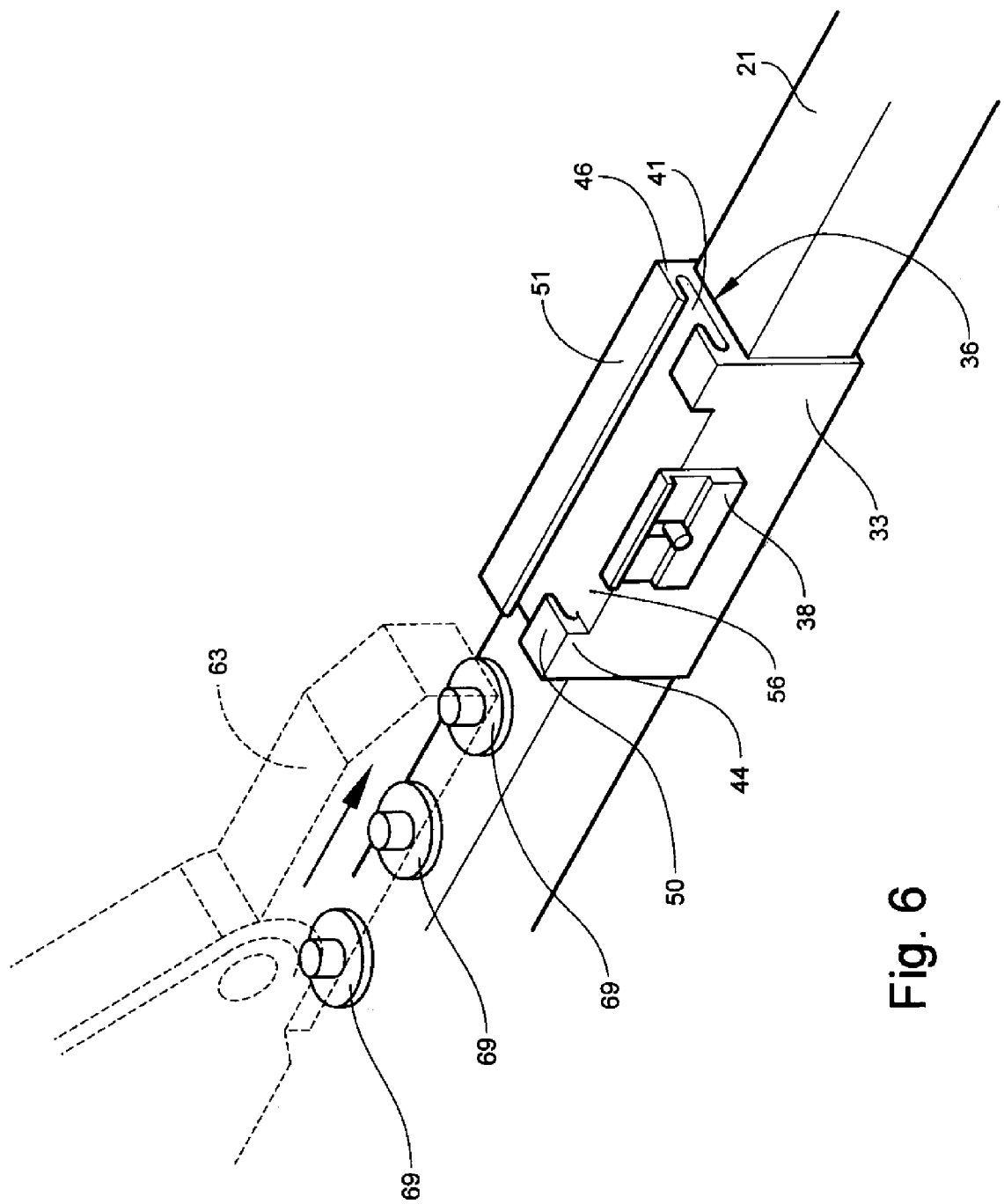
FIG. 6 shows a rear foot of the seat being positioned into the foot locking device of FIG. 3.
Figure 7:
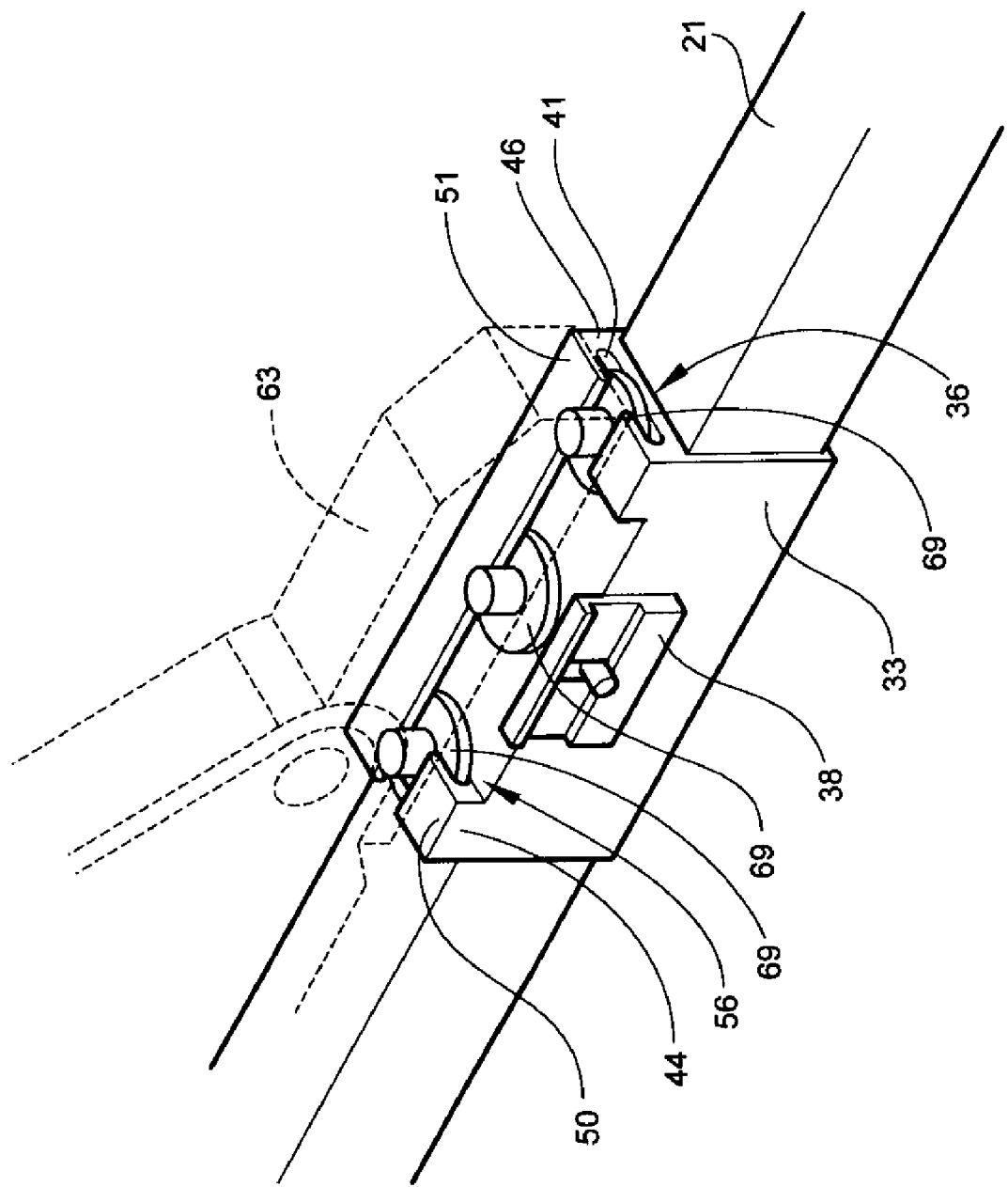
FIG. 7 shows the rear foot of the pallet shown in FIG. 6 locked in position in the foot locking device.

As illustrated in FIGS. 6 and 7, foot 63 is positioned in alignment with locking track 36. The foot 63 is then slid into the locking track 36, thereby positioning the studs 69 in the slot 41. When sliding foot 63, the studs 69 slide within the slot 41 in the undercut areas beneath the shoulders 50 and 51 to lock the seat 57 against vertical movement while still allowing sliding movement of the seat 57 along the slot 41. Once foot 63 has been secured in the locking track 36, foot 60 may be secured to locking track 34.

Figure 8:
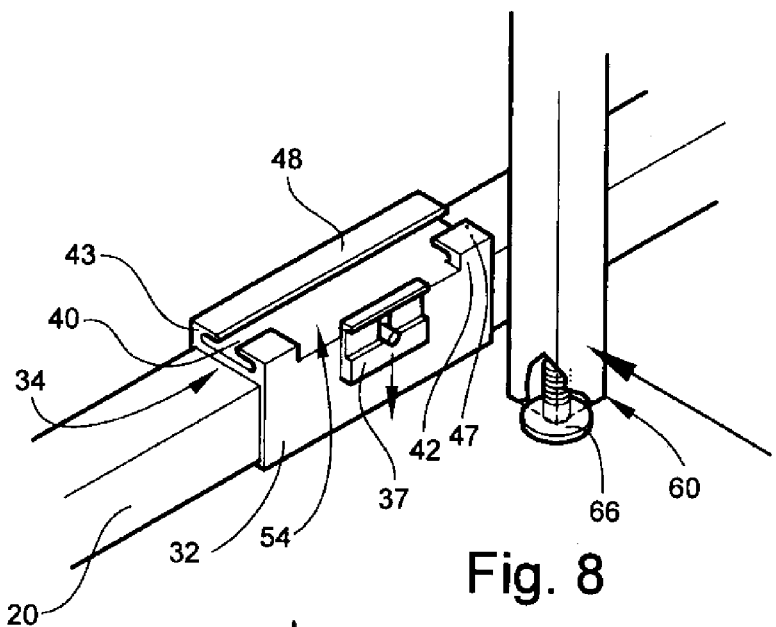
FIG. 8 shows a front foot of the seat shown in FIG. 5, and the foot locking device of FIG. 2.
Figure 9:
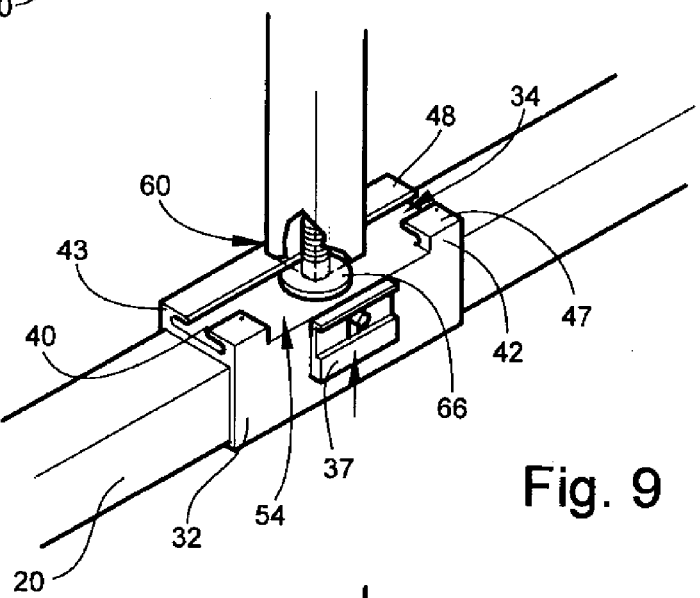
FIG. 9 shows the front foot shown in FIG. 8 being positioned in the foot locking device.
Figure 10:
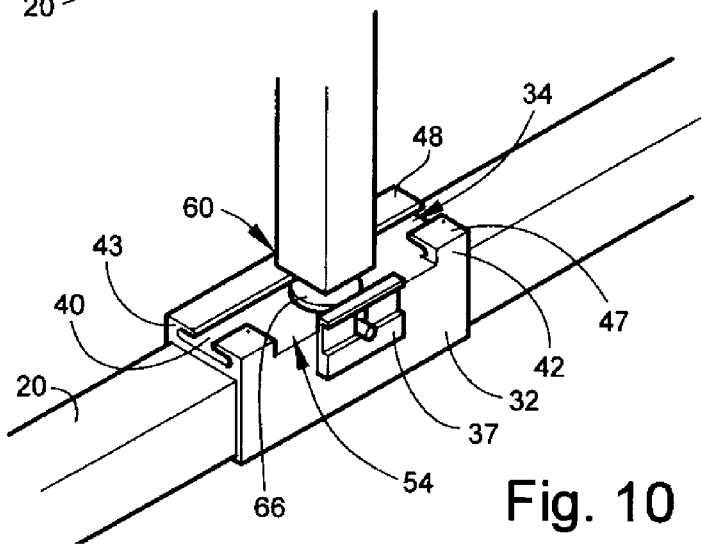
FIG. 10 shows the front foot being locked in position in the foot locking device.

As shown in FIGS. 8-10, foot 60 is secured in locking track 34 by moving the lock 37 into an unlocked position, FIG. 8, thereby allowing the foot 60 to slide into the locking track 34 through the opening 54 in the sidewall 42. It should be noted that foot 60 can also slide into the locking track 34 in the same manner that foot 63 slides into locking track 36. The seat support member 20 is then moved towards the foot 60 to position the foot 60 in the slot 40 of the locking track 34. Once foot 60 has been positioned in the slot 40 of the locking track 34, the lock 37 is moved into the locked position, FIG. 10, to secure the foot 60.

With feet 60 and 63 secured in locking tracks 34 and 36, the seat support members 20 and 21 and foot locking devices 34 and 36 may be moved to make adjustments and to position the seat 57 in the center of the platform 11. Once the adjustments have made, the seat support members 20 and 21 are locked in position by locks 26, 27 and 30, 31.

While the process of securing the seat 57 to the platform 11 has been described by securing foot 63 in locking track 36 and then securing foot 60 in locking track 34, it should be appreciated that the process may be reversed to secure foot 60 first. Further, the seat 57 could be turned around on the platform 11 to position foot 62 in locking track 34 and foot 61 in locking track 36.

To remove the seat 57 from the platform 11, the seat support member 20 is unlocked to allow the seat support member 20 to slide within the slots 22 and 23. Lock 37 is also moved to the unlocked position, FIG. 9, to allow the foot 60 to slide out of the slot 40. Foot 63 is then removed from the foot locking device 33. Once foot 63 has been released, the seat 57 may be slid along the slot 41, thereby allowing the studs 69 to be removed from the slot 41 and allowing the seat to be lifted upwardly and removed from the platform 11. The pallet 10 can then be returned to the seat manufacturer and reused to deliver additional seats.

Figure 11:
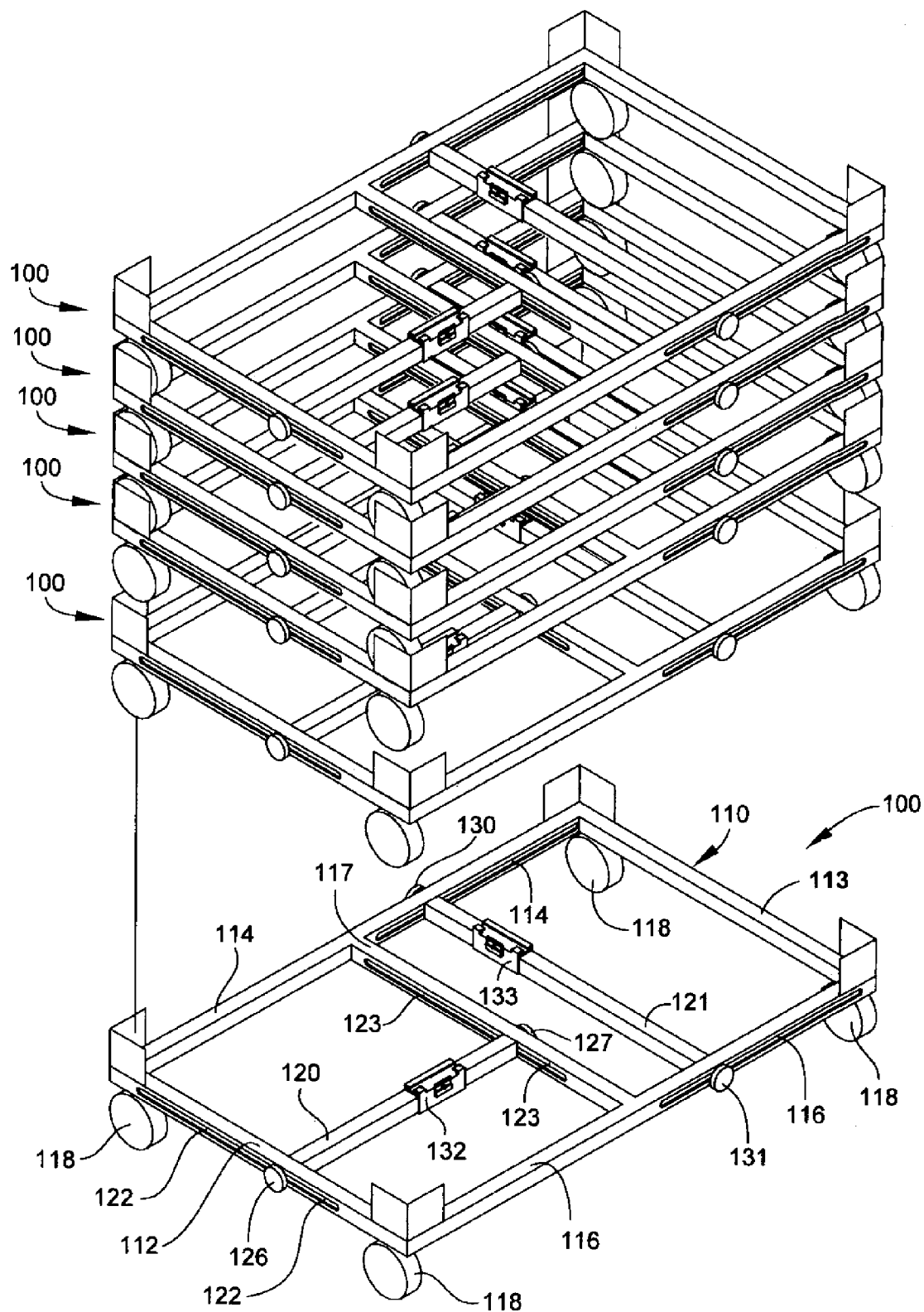
FIG. 11 shows several modified stackable seat delivery pallets.

Referring to FIG. 11, a pallet 100 according to another embodiment of the invention is shown. Pallet 100 operates in the same manner as pallet 10; however, pallet 100 is designed to permit stacking of a plurality of pallets. Like pallet 10, pallet 100 includes a platform 110 having end rails 112 and 113, side rails 114 and 116, a center rail 117, and wheels or rollers, such as castors 118. Seat support members 120 and 121 with foot locking devices 132 and 133 are attached for sliding movement to the platform via slots 122, 123 and 124, 125. The seat support members 120 and 121 are locked in position by locks 126, 127 and 130, 131.

Pallet 100 includes stacking members 140-143 positioned on the corners of the platform 110. As shown, each of the stacking members 140-143 extend around the corners of the platform 110 and collectively define an inner boundary therebetween sized to receive the castors of a like pallet therein.

As illustrated in FIG. 11, several of the pallets 100 are stacked on top of each other by positioning the castors 118 such that each of the castors 118 reside adjacent to a respective one of the stacking members 140-143. The stacking members 140-143 provide a stop to prevent the stacked pallets 100 from sliding off, and a support structure for another pallet 100 to rest, thereby creating a stackable pallet system that is very stable. The pallets 100 can be removed from the stack by lifting them upwardly to disengage the castors 120 from the stacking members 140-143.

A seat delivery pallet is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. A seat delivery pallet, comprising:
    (a) a platform having first and second end members, first and second side members, and a center member extending between the first and second side members;
    (b) an elongate first seat support member positioned between and moveably attached to the first end member and the center member;
    (c) an elongate second seat support member positioned perpendicular to the first seat support member, the second seat support member positioned between and moveably attached to the first and second side members;
    (d) a first foot locking device attached to infinitely slidably adjustable along the first seat support member within a predetermined range of adjustment; and
    (e) a second foot locking device attached to and infinitely slidably adjustable along the second seat support member within a predetermined range of adjustment wherein a first foot of a seat is secured in the first foot locking device and a second foot of the seat is secured in the second foot locking device to secure the seat to the platform.

2. The seat delivery pallet according to claim 1, wherein each of the first and second foot locking devices includes a locking track to allow sliding movement of a foot therein and prevent vertical movement of the foot.

3. The seat delivery pallet according to claim 2, wherein the locking track includes a slot positioned between spaced-apart sidewalls.

4. The seat delivery pallet according to claim 3, wherein each of the sidewalls includes a horizontally disposed shoulder extending inwardly into the slot to prevent the foot from moving vertically out of the slot.

5. The seat delivery pallet according to claim 2, wherein the first and second foot locking devices each include a lock to prevent the first and second foot locking devices from sliding along respective first and second seat support members.

6. The seat delivery pallet according to claim 5, wherein the lock is moveable between a locked position and an unlocked position.

7. The seat delivery pallet according to claim 6, wherein in the locked position the lock extends upwardly to act as a sidewall.

8. The seat delivery pallet according to claim 1, and further including stacking members positioned on each corner of the platform to allow multiple like pallets to be stacked.

9. The seat delivery pallet according to claim 1 further including castors or wheels attached to a bottom of the platform to allow movement.

10. A seat delivery pallet adapted to secure seats having various sizes, comprising:
    (a) first and second end members, first and second side members, and a center member extending between the first and second side members;
    (b) an elongate first seat support member positioned between and moveably connected to the first end member and the center member;
    (c) an elongate second seat support member positioned perpendicular to the first seat support member, the second seat support member positioned between and moveably connected to the first and second side members; and
    (d) a first foot locking device attached to and infinitely slidably adjustable along the first seat support member within a predetermined range of adjustment; and
    (e) a second foot locking device attached to and infinitely slidably adjustable along the second seat support member within a predetermined range of adjustment.

11. The seat delivery pallet according to claim 10, wherein one foot locking device is slidable toward the center member.

12. The seat delivery pallet according to claim 11 wherein one foot locking device is slidable toward one of the side members.

13. The seat delivery pallet according to claim 12 wherein one of the first and second end members includes a slot for receiving one of the seat support members.

14. The seat delivery pallet according to claim 13 wherein the center member includes a slot for receiving one of the seat support members.

15. The seat delivery pallet according to claim 14, wherein each of the side members includes a slot for receiving one of the seat support members.

16. The seat delivery pallet according to claim 15, wherein one support member is slidable toward the center member.

17. The seat delivery pallet according to claim 16, wherein one support member is slidable toward one of the side rails.

18. The seat delivery pallet according to claim 17 wherein each support member is selectively securable in a pair of opposing slots.

19. The seat delivery pallet according to claim 18 wherein the first support member is disposed transverse the second support member.

20. A method of delivering a seat having feet with enlarged locking studs, comprising the steps of:
  (a) providing a seat delivery pallet, comprising:
    (i) a platform having first and second end members, first and second side members, and a center member extending between the first and second side members;
    (ii) an elongate first seat support member positioned between and moveably attached to the first end member and the center member;
    (iii) an elongate second seat support member positioned perpendicular to the first seat support member, the second seat support member positioned between and moveably attached to the first and second side members; and
    (iv) a first foot locking device attached to and infinitely slidably adjustable along the first seat support member within a predetermined range of adjustment; and
    (v) a second foot locking device attached to and infinitely slidably adjustable along the second seat support member within a predetermined range of adjustment;
  (b) securing at least a first locking stud and a second locking stud of the seat to the seat delivery pallet by
    (i) first securing the first locking stud in one of either the first and second foot locking devices by a first linear movement of the first locking stud relative to the foot locking device, and then
    (ii) securing the second locking stud in the other of the first and second foot locking devices by a second linear movement of the locking stud relative to the foot locking device, wherein the second linear movement perpendicular to the first linear movement;
  (c) adjusting the position of the first seat support member or the second seat support member after securing the first and second locking studs to the seat delivery pallet; and
  (d) securing the first and second support members in position.

* * * * *

UNITED STATES PATENT AND TRADEMARK OFFICE
CERTIFICATE OF CORRECTION

PATENT NO.         : 7,503,571 B2                                           Page 1 of 1
APPLICATION NO. : 11/673653
DATED              : March 17, 2009
INVENTOR(S)        : Victor Cromie It is certified that error appears in the above-identified patent and that said Letters Patent is hereby corrected as shown below:

In column 6, line 1, insert --and-- between to and infinitely.

Signed and Sealed this

Ninth Day of June, 2009

JOHN DOLL
*Acting Director of the United States Patent and Trademark Office*